(12) United States Patent
Shapiro et al.

(10) Patent No.: US 7,555,769 B1
(45) Date of Patent: Jun. 30, 2009

(54) SECURITY POLICY USER INTERFACE

(75) Inventors: William M. Shapiro, Palo Alto, CA (US); Joseph D. Steele, Danville, CA (US)

(73) Assignee: Adobe Systems Incorporated, San Jose, CA (US)

( * ) Notice: Subject to any disclaimer, the term of this patent is extended or adjusted under 35 U.S.C. 154(b) by 629 days.

(21) Appl. No.: 11/016,258

(22) Filed: Dec. 16, 2004

(51) Int. Cl.
*G06F 17/00* (2006.01)
*G06F 3/00* (2006.01)

(52) U.S. Cl. .............................. 726/1; 715/700; 715/741
(58) Field of Classification Search ........................ None
See application file for complete search history.

(56) References Cited

U.S. PATENT DOCUMENTS

| | | | |
|---|---|---|---|
| 6,599,324 B2* | 7/2003 | Saito et al. | 715/513 |
| 6,963,858 B2* | 11/2005 | Wang et al. | 705/51 |
| 6,976,009 B2* | 12/2005 | Tadayon et al. | 705/51 |
| 7,062,649 B2* | 6/2006 | Daniell et al. | 713/165 |
| 7,089,248 B1* | 8/2006 | King et al. | 707/10 |
| 2001/0039551 A1* | 11/2001 | Saito et al. | 707/500 |
| 2003/0065942 A1* | 4/2003 | Lineman et al. | 713/201 |
| 2004/0193606 A1* | 9/2004 | Arai et al. | 707/9 |
| 2005/0071658 A1* | 3/2005 | Nath et al. | 713/193 |
| 2006/0005227 A1* | 1/2006 | Samuelsson et al. | 726/1 |
| 2006/0212593 A1* | 9/2006 | Patrick et al. | 709/230 |

OTHER PUBLICATIONS

Bwang, Gwan-Hwan and Chang, Tao-Ku, "Document Security Language (DSL) and an Efficient Automatic Securing Tool for XML Documents", Proceedings of the 2nd International Conference on Internet Computing, vol. 1, pp. 393-399, Las Vegas, USA, Jun. 2001, CSREA Press, ISBN 1-892512-8-X.

* cited by examiner

*Primary Examiner*—Christian LaForgia
(74) *Attorney, Agent, or Firm*—Fish & Richardson P.C.

(57) ABSTRACT

Methods and apparatus, including computer systems and program products, that relate to a security policy user interface. The methods feature a machine-implemented method that includes presenting labels of multiple security policies, receiving input specifying a selected security policy, and securing a first document according to the selected security policy. In that method, each security policy specifies criteria that governs use of an electronic document and has an associated security mechanism. Moreover, security mechanisms of a number of the multiple security policies distinctly enforce security of a document, and presenting labels of multiple security policies includes presenting at least two labels of two respective security policies such that a detailed description of a respective, associated security mechanism is left out. The security policies can be declarative security policies. At least one of the labels can include an abstract of a corresponding security mechanism.

45 Claims, 8 Drawing Sheets

New Security Policy

Steps
- Select the type of security
- ⇨ General settings
- Recipient permissions
- Summary

---

Enter the general information for this Adobe Policy Server policy.

Policy name: [Security Team]   max. 50 Characters ← 155

Description: [This policy is used to encrypt documents when collaborating with the Security team]   max. 250 Characters ← 160

} 130

Validity period:
- ○ Document will not be valid after this many days [1]
- ○ Document will not be valid after this date
- ○ Document is valid from [ ] to [ ]
- ● Document is always valid Select Document Components to Encrypt
- ● Encrypt all document contents
- ○ Encrypt all document contents except metadata
- ○ Encrypt only file attachments
- ☑ All contents of the document will be encrypted and search engines will not be able to access the document's metadata.

} 135

☑ Audit documents

[Cancel]   [< Back]  [Next >]

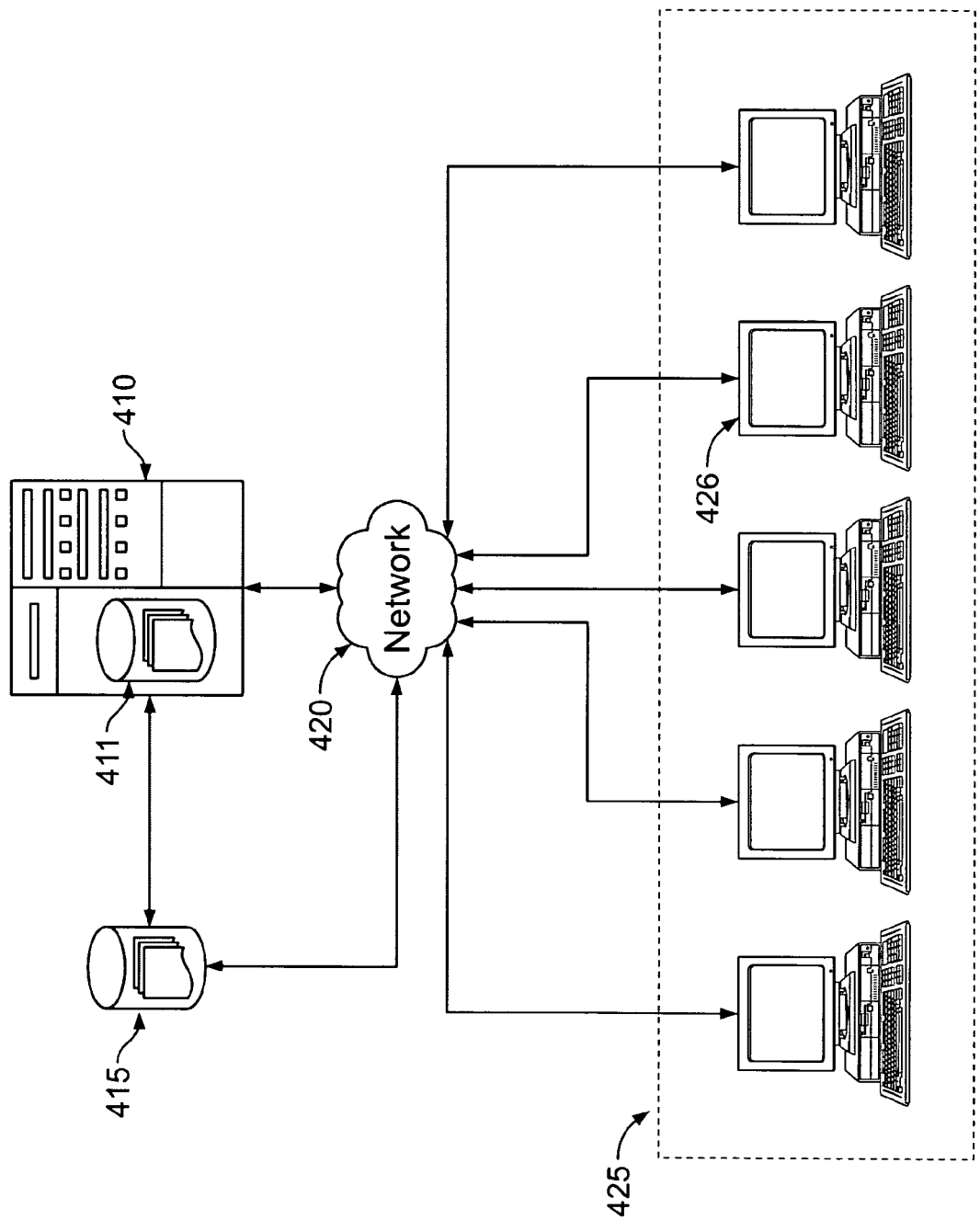

SECURITY POLICY USER INTERFACE

BACKGROUND OF THE INVENTION

The present invention relates to a security policy user interface.

Electronic documents, such as word processing documents and electronic mail, can be distributed to millions of computer users. To prevent unintended recipients from accessing a document that contains sensitive information, security mechanisms, such as public key infrastructure (PKI) security, are commonly used.

Different security mechanisms can enforce security of a document differently. For example, some security mechanisms can require a certificate for access to a document, while others can require a password for access to a document, and some security mechanisms can require both. Security mechanisms can limit a type or types of access granted to a document. For example, one type of security mechanism can limit access of a first user to print-only access (e.g., the first user can only print a document) and limit access of a second user to read and copy access (e.g., the second user can read the document and copy the document).

SUMMARY OF THE INVENTION

Described herein are methods and apparatus, including computer program products, that relate to a security policy user interface.

In one general aspect, the methods feature a machine-implemented method of securing a document. That method includes presenting labels of multiple security policies, receiving input specifying a selected security policy, and securing a first document according to the selected security policy. In that method, each security policy specifies criteria that governs use of an electronic document and has an associated security mechanism. Moreover, security mechanisms of a number of the multiple security policies distinctly enforce security of a document, and presenting labels of multiple security policies includes presenting at least two labels of two respective security policies such that a detailed description of a respective, associated security mechanism is left out.

Implementations can include one or more of the following features. Criteria that govern use of an electronic document for at least one of the multiple security policies can include user permission information. Securing a first document according to the selected security policy can include restricting access to the first document according to the user permission information. A document can be secured according to the selected security policy without requiring a user to input settings for a security mechanism associated with the selected security policy. A first security mechanism might not distinctly enforce security of a document as compared to a second security mechanism if the first and second security mechanisms employ a model of security enforcement but differ in one or more aspects of the security enforcement, the one or more aspects being selected from a group including encryption algorithm and encryption strength. At least one of the labels can include an abstract of a corresponding security mechanism. At least one of the labels can include a name and a brief description. The selected security policy can be associated with public key infrastructure security and securing a first document according to the selected security policy can include securing the document according to public key infrastructure security.

The security policies can be associated with client-based security mechanisms and server-based security mechanisms, and securing a first document according to the selected security policy can include securing the first document according to a client-based security mechanism if the selected security policy is associated with the client-based security mechanism and securing the first document according to a server-based security mechanism if the selected security policy is associated with the server-based security mechanism. The client-based security mechanism can include password security.

The security policies can be declarative security policies. The security policies can be written in multiple security languages and securing a first document according the selected security policy can include interpreting at least one of the multiple security languages.

The machine-implemented method can further include presenting a user interface to receive user input including settings of a first user-defined security policy, where the settings include a specification of a first one or more security mechanisms and a first label of the first user-defined security policy. The machine-implemented method can further include receiving the settings; and generating the first user-defined security policy such that the first user-defined security policy is associated with the first security mechanisms and includes the first label. The machine-implemented method can further include distributing the multiple security policies to users from a central server.

In another aspect, a computer program product, tangibly embodied in an information carrier, is operable to cause data processing apparatus to perform operations that include presenting labels of first security policies, receiving a selection of a security policy from the first security policies, determining which security mechanism can be associated with the selection of a security policy, and securing a document according to the security mechanism that is determined to be associated with the selection of a security policy. In that computer program product, second security policies have associated security mechanisms that distinctly enforce security of a document and presenting labels of first security policies includes presenting at least two of the labels such that detailed descriptions of security mechanisms associated with respective security policies are left out.

Implementations can include a feature where at least one of the second security policies can further specify user permission information.

In another aspect, an apparatus includes a user interface to present labels of multiple security policies to a user and receive a selection of a security policy from the security policies, where the security policies specify securing a document with one or more security mechanisms and the user interface presents labels of the security policies such that for at least two security policies detailed descriptions of associated security mechanisms are left out. The apparatus also includes a security application tool to secure a document with one or more security mechanisms specified in a selected security policy, where the selected security policy is selected in the user interface, and the security application tool supports multiple security mechanisms and determines which security mechanisms are specified in a selected security policy.

Implementations can include one or more of the following features. At least one of the security policies can further specify user permission information. The security application tool can be further operable to generate a first user-defined security policy, where the first user-defined security policy is associated with a first one or more security mechanisms and includes a first label. The apparatus can further include a second user interface to receive user input including settings of a first user-defined security policy, where the settings including a specification of the first one or more security mechanisms and the first label of the first user-defined security policy.

The apparatus can further include an administration tool to administer at least some of the security policies, where administering at least some of the security policies can include distributing the at least some of the security policies to users and modifying a subset of the security policies. The administration tool can administer all of the security policies.

The invention can be implemented to realize one or more of the following advantages. A simplified user interface can be provided for a document security system that is policy-based (within this document policy is shorthand for "security policy"). The document security system can support multiple security mechanisms such that different technologies can be chosen to secure a document. With the user interface, a user can choose a policy from multiple policies simply based on a label that corresponds to the policy. The label can be a name, brief description of the policy, or both, rather than a description that includes detailed information about the policy. Thus, a user need not understand details of policies to make an informed selection of a policy to use (e.g., a user need not be familiar with the security mechanism(s) associated with a policy). In addition, because the information used to secure a document can be complex, presenting security policies to users with merely a name and/or brief description can reduce an amount of time spent securing documents and a potential for error.

A policy can be selected and a document can be secured without requiring a user to input settings of the policy, the security mechanism(s) associated with the policy, or both, thus avoiding confusing details of a policy, the underlying security mechanism(s), or both, and simplifying the workflow for a user.

A user can create policies of their own that can include user-defined labels, such as user-defined brief descriptions. By allowing a user to create their own labels, users can employ labels that they would readily associate with a policy, rather than being confined to labels pre-configured for a user (e.g., labels that are already chosen for a user) and might not be readily associated with a policy.

Pre-configured policies can be distributed across a group of users. For example, there can be default policies that are distributable among a group of users by a system administrator. By having policies that can be distributed, a group of users can have similar policies that they can use for similar purposes, and consistent practices for securing documents can be utilized. For example, two policies can be distributed across a group of engineers and that group of engineers can have practices where the first policy is used for a certain type of document and a second type of policy is used for a second type of document. The document security system can allow for plug-ins for new security mechanisms that can be used in policies—increasing the flexibility of a document security system and enabling user-defined policies to use plug-in security mechanisms.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 1A-1D show user interfaces of a process of defining a security policy.

FIG. 4 illustrates an example system in which policies can be distributed and enforced.

Like reference symbols in the various drawings indicate like elements.

DETAILED DESCRIPTION

An electronic document does not necessarily correspond to a file. A document can be stored in a portion of a file that holds other documents, in a single file dedicated to the document in question, or in multiple coordinated files.

FIGS. 1A-1D show user interfaces of a process of defining a security policy (within this document policy is shorthand for "security policy"; also, as used herein, a user interface includes, for example, the underlying software component and/or structure of graphical elements that make up a display on a display device when a user interface is presented to a user). A policy includes a specification of a security mechanism (or mechanisms) to use to secure a document (also referred to as "electronic document"), and can further include user permission information (e.g., can print, read, modify, copy, and the like) and properties of the policy (e.g., a label, such as a name, of a policy). A policy is external to a document (e.g., where a policy is not part of a document to be secured by the policy) and can be applied to multiple documents. Also, a policy is not necessarily attached to an instance of an application (e.g., an installation of an application). Policies can be declarative. For example, a policy can declare that password security (a type of security mechanism) is used. A declarative language describes relations that specify task(s) to be performed, but not how these task(s) are performed. This is in contrast to, for example, a procedural language, such as a scripting language, which describes relationships in terms of a specific sequence of actions.

Each of FIGS. 1A-1D shows a user interface that is presented to a user (e.g., an end-user that desires to secure a document or an administrative user that desires to define policies for end-users) during the process of defining a policy. In alternative implementations the styles of user interfaces and series of user interfaces presented to a user during a process of defining a policy can vary. Also, although a policy is user-defined by the process illustrated by FIGS. 1A-1D, there can be default policies (e.g., policies that are not user-defined and are pre-configured).

Figure 1A:
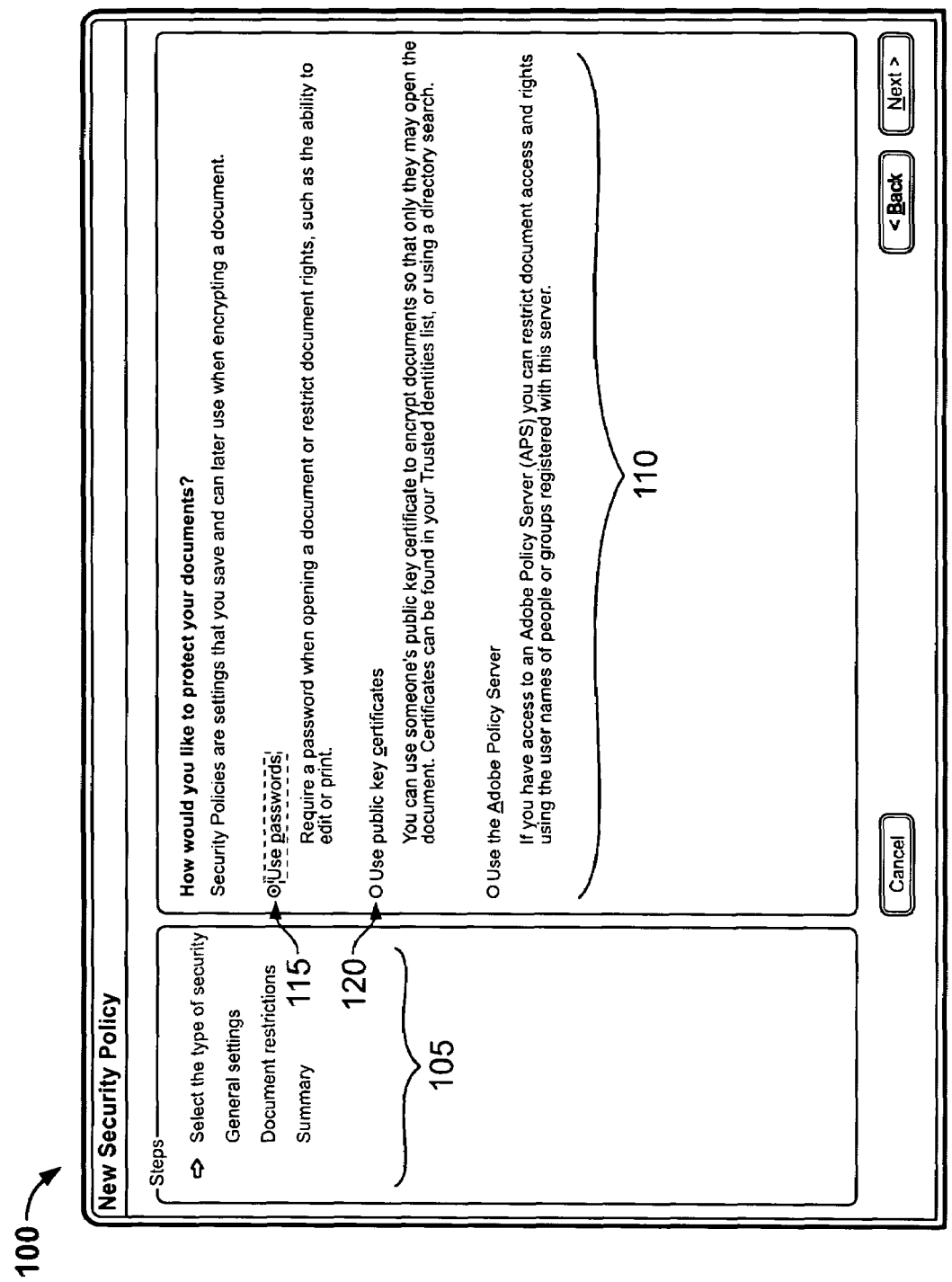

In FIG. 1A, a user interface 100 includes a first window pane 105 that has an overview of a process of defining a security policy and a second window pane 110 that has different types of security mechanisms that can be chosen by a user. The first window pane 105 shows that a first part of the process involves selecting a security mechanism such that a type of security is selected.

The user interface 100 is used to receive a selection of a security mechanism for a user-defined policy. Each of the choices is accompanied by a description of a corresponding security mechanism. For example, the choice 115 is accompanied by a description that recites, "Use passwords". The descriptions include detailed information about a security mechanism, as, for example, the choice 115 describes that a password is required when opening a document or otherwise accessing a document with restricted document rights. Because the descriptions include specific information about a security mechanism, a user choosing among the policies (e.g., an administrative user that creates policies) should understand the underlying security mechanisms to understand the significance of the descriptions and the choices available. As an example, for the choice 120 accompanied by the description "Use public key certificates," a user should understand the significance of encrypting a document using someone's public key certificate such that only that person can open the document.

Figure 1C:
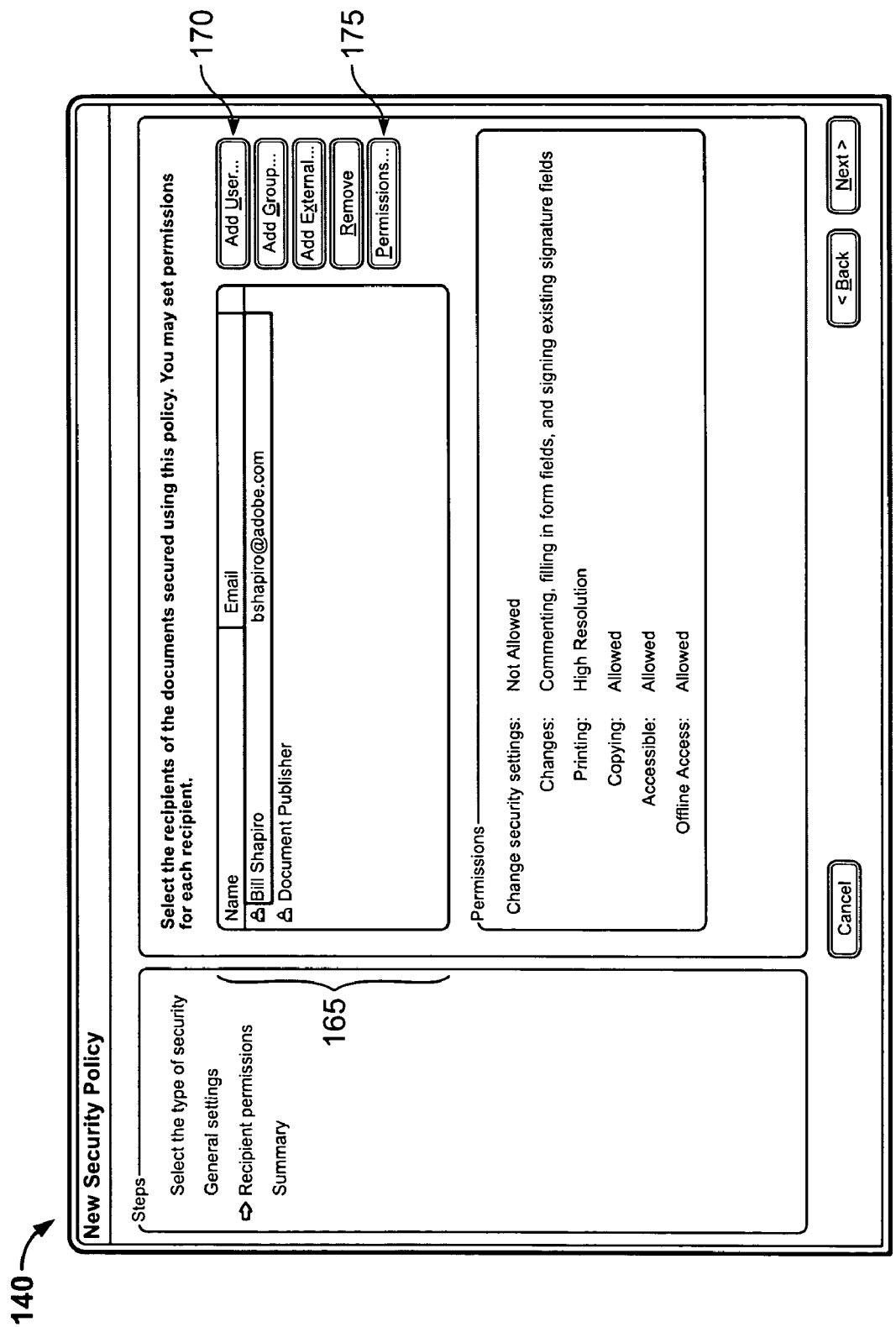
Figure 1D:
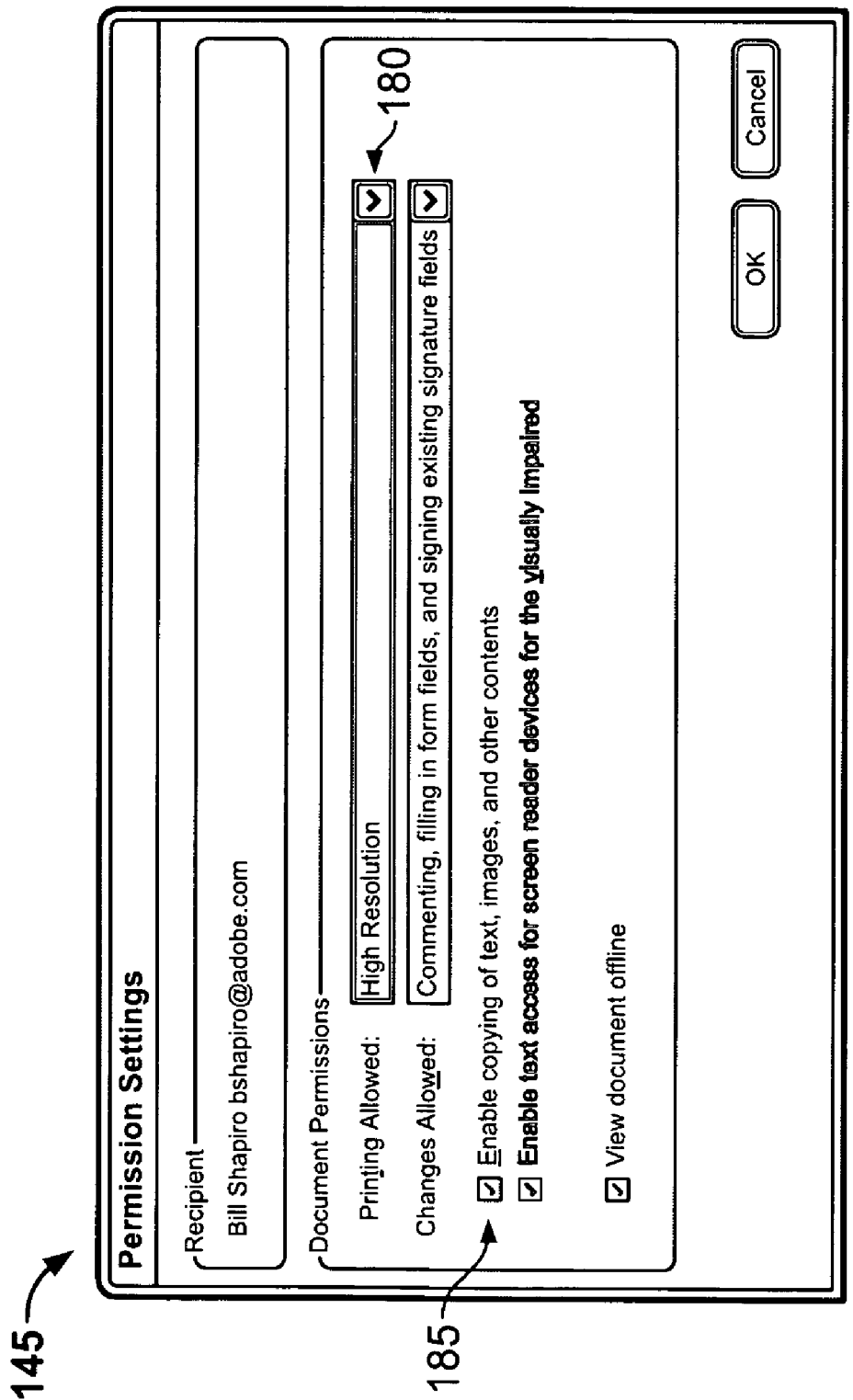

The user interface 125 of FIG. 1B is used for inputting properties (also referred to as general settings) of the security policy that is being defined and security mechanism settings (also referred to as specific settings of a security policy), and the user interfaces 140 and 145 of FIGS. 1C and 1D, respectively, are used for inputting security mechanism settings. All of the user interfaces 125, 140, 145 include detailed information about a security mechanism that is selected and a security policy that is to be generated, as these settings include specific information about the security mechanism settings and settings of the policy.

In the user interface 125 of FIG. 1B, a label 130 of the user-defined policy can be inputted. The label 130 can include a name and brief description, which can be received as input from the text fields 155 and 160, respectively, and the label 130 can be freely chosen. For example, the label 130 need not be a description of the security mechanism selected in the user interface 100 of FIG. 1A. As another example, the label 130 can be an abstract of the security mechanism chosen (e.g., a user can abstract a security mechanism underlying a policy to generate a brief description, also referred to as an abstract, of the security policy; as used herein, abstract generally refers to a description and abstraction refers to the representation of an abstract in underlying software components and/or structures that are presented to a user, e.g., a label in a user interface can be an abstraction of a security mechanism). As another example, the label 130 need not include detailed information about the security mechanism chosen. Thus, a user need not understand the underlying security mechanism of a policy to make a decision as to which security policy to apply. Also, an abstract or description of the security mechanism can be more useful than detailed information about the security mechanism (e.g., an abstract can be meaningful to a user). For example, a description of public key certificate encryption, such as "security to use for inter-office e-mail" can be more useful than "public key certificate encryption."

Properties 135 of a policy, other than a label, can be configured in the user interface 125. As examples, a choice of whether to restrict the document or attachments, and a choice as to whether to secure metadata are included in the user interface 125. In addition to properties, security mechanism specific information can be configured in the user interface 125. As examples, a validity period can be configured in the user interface 125.

The security mechanism specific information that is configured in the user interfaces 140 and 145 of FIGS. 1C and 1D includes user permission information. The user interfaces 140 and 145 can correspond to information specific to a policy using Adobe Policy Server (described later). For different security mechanisms, the user interfaces and configurable settings can differ. User permission information (which can be enforced by digital rights management mechanisms, e.g., password security for which a shared password grants certain permissions; access control list security, e.g., having a list of users and associated permissions for the users; and the like) restricts the permissions a user or users have to access a document. For example, a user can be restricted to reading a document, in which case a user is not permitted to modify a document. Many different types of access can be restricted, such as reading, modifying, copying, printing, and the like.

In the user interface 140 shown in FIG. 1C, a list of users that can access the document is included in a list box 165. Various components of the user interface 140 enable changes to the list of users and permissions for the users. For example, a user can be added by the button 170, "Add User . . . ", and user permissions can be modified by the button 175, "Permissions . . . ".

In the user interface 145 of FIG. 1D, user permissions can be modified. For example, different resolutions of printing can be chosen for a user from the pull-down box 180. As another example, different permissions, such as enabling copying of text and images, can be chosen by the checkbox 185.

Figure 2A:
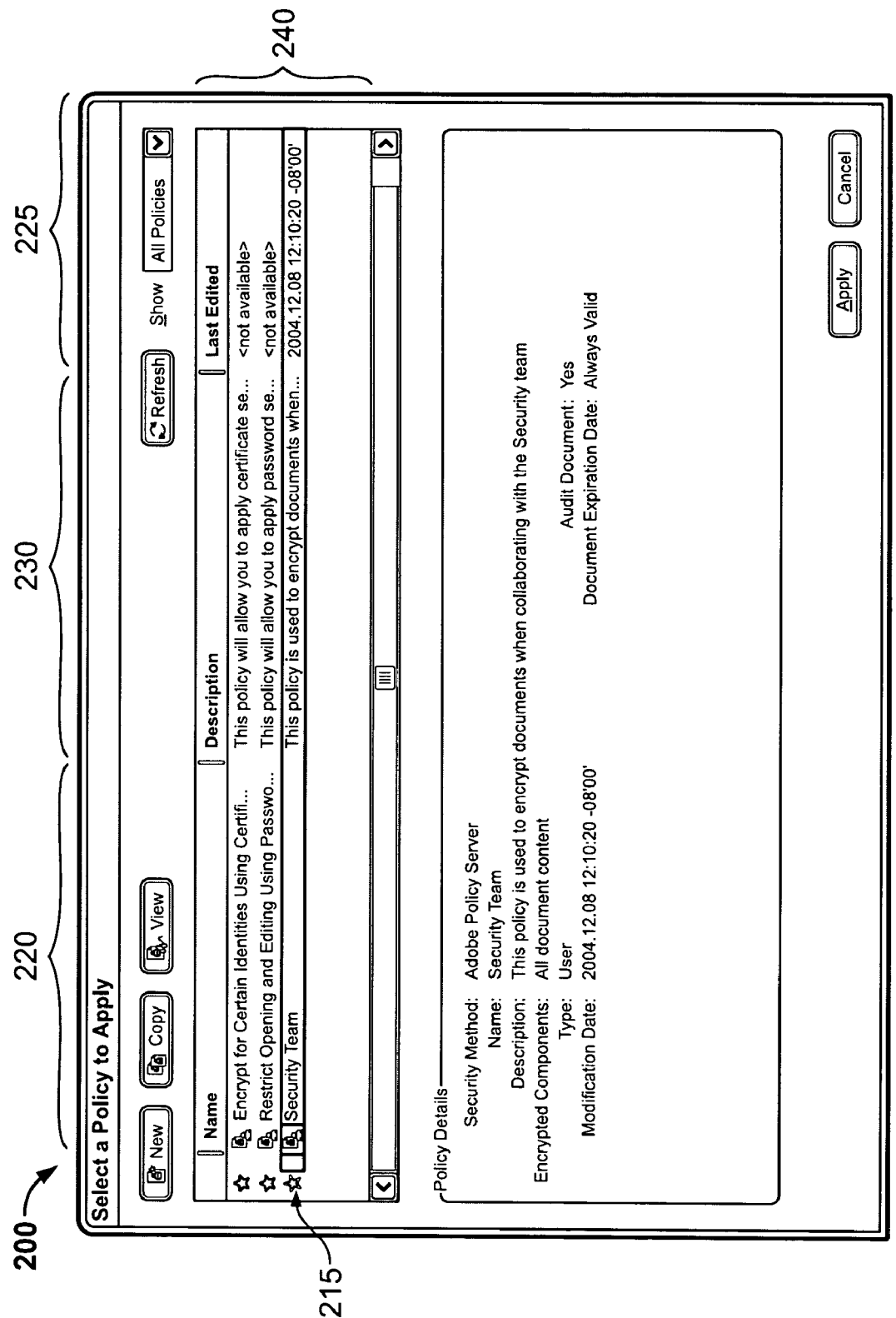
FIGS. 2A and 2B show user interfaces that can be used to select a policy.
Figure 2B:
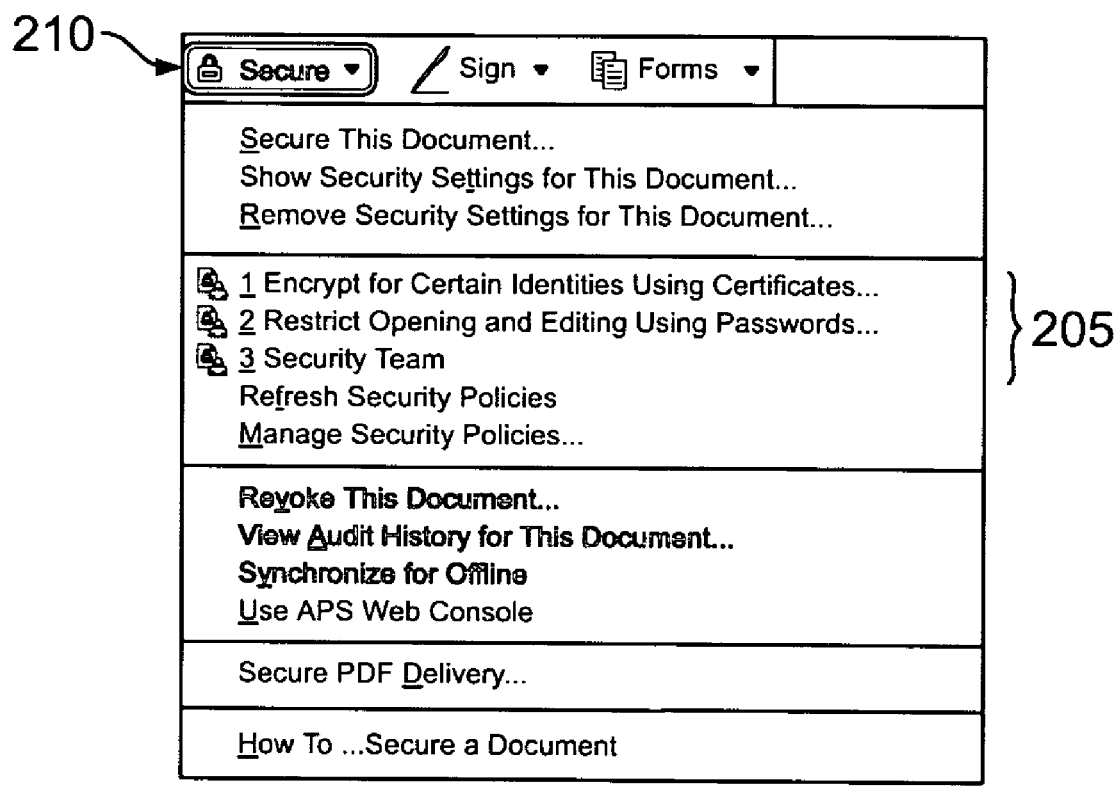

FIGS. 2A and 2B show user interfaces 200 and 205 that can be used to select a policy. The user interface 200 includes a dialog box, whereas the user interface 205 includes a menu list (as referenced in regards to FIGS. 2A and 2B, "user" generally refers to an end-user, e.g., an end-user that desires to secure a document, but can also refer to other types of users). The user interfaces 200 and 205 can be part of a same application program that is used for securing documents. The user interfaces 200 and 205 can be presented to a user in response to different types of user input. For example, the user interface 200 is a dialog box and can appear in response to a selection from a menu list (e.g., a menu item "Apply a security policy to the document") and the user interface 205 can appear in response to a user clicking on the security icon 210.

Both user interfaces 200 and 205 include lists of labels of policies that can be applied to a document. Each of the labels in the user interfaces 200 and 205 have a corresponding policy, and each of the policies has an associated security mechanism. The labels of policies can be user-defined labels (e.g., labels that are defined as part of the process illustrated by FIGS. 1A-1D) or the labels can be pre-defined (e.g., provided with default policies that can be used to secure a document).

The policies can reside on a user's computer system or somewhere else. The security policies can be administered by an administration server, where an administrator can distribute and modify policies for a group of users. For example, an administrator can use the process of FIGS. 1A-1D to generate policies and then distribute those policies to users. If the group of users changes (e.g., if there is a new employee or if an employee is no longer at a job), the administrator can change the policies and add or remove user permission information. As another example, if a new security mechanism is used as a plug-in, policies can be changed by an administrator to incorporate the new security mechanism.

A policy is selected in either of the user interfaces by selecting a list item that includes a label. Then, the security tool or application program that presents the user interfaces 200 and/or 205 can determine which policy corresponds to the label (of the selected list item). For example, the user interface 200 of FIG. 2A includes a list of policies 240, where each item in the list includes a label that includes a name 220 and description 230 (e.g., an abstract), and the last time the policies were edited 225. One item 215 in the list has a label including the name "Security Team" and includes the description "This policy is used to encrypt documents when . . . ." Were the item 215 to be selected, the label could be used to determine a policy that corresponds to the label (any suitable software component can make this determination; e.g., a tool for securing documents that presents the user interface 200, including a security a tool of a word processing application). Then, that policy can be used to determine a security mechanism with which to secure a document.

A user need not be concerned with the technical details of security mechanisms when selecting a policy with which to secure a document because a label can be freely defined (as explained earlier), a user can be presented with labels of security policies that leave out detailed information of security mechanisms, an application can determine which policies correspond to which labels and determine a security mechanism to apply, and a user need not input settings of a security policy (which include detailed information about a security policy). In other words, in lieu of a user being presented with detailed information about a security mechanism associated with a policy, a user is presented with a label of a policy that does not include detailed information and can be represented by, for example, an abstraction of the security mechanism. As an alternative, in some implementations, detailed information can be actively hidden or excluded from being presented to a user.

Documents need not be secured immediately. When a policy is selected (by its corresponding label) in either of the user interfaces, the document can be secured at that time, or the policy selection can be stored and the document can be secured at a later time. For example, documents can be secured with security mechanisms when the documents are persisted.

In alternative implementations other styles and types of user interface can be used for selecting a policy or policies to secure a document. Although policies were described as having a single corresponding security mechanism, in alternative implementations a policy can have one or more corresponding security mechanisms and a document can be secured with multiple security mechanisms. Although the user interfaces in FIGS. 2A and 2B exclude detailed information about security mechanisms that are associated with a policy, in some implementations, detailed information about some of the policies can be presented in combination with a presentation of policies that does not include detailed information. When settings are common across security mechanisms, a user interface can be configured to present as many of the same settings in a common user interface (e.g., in a user interface similar to the user interface 125).

Figure 3:
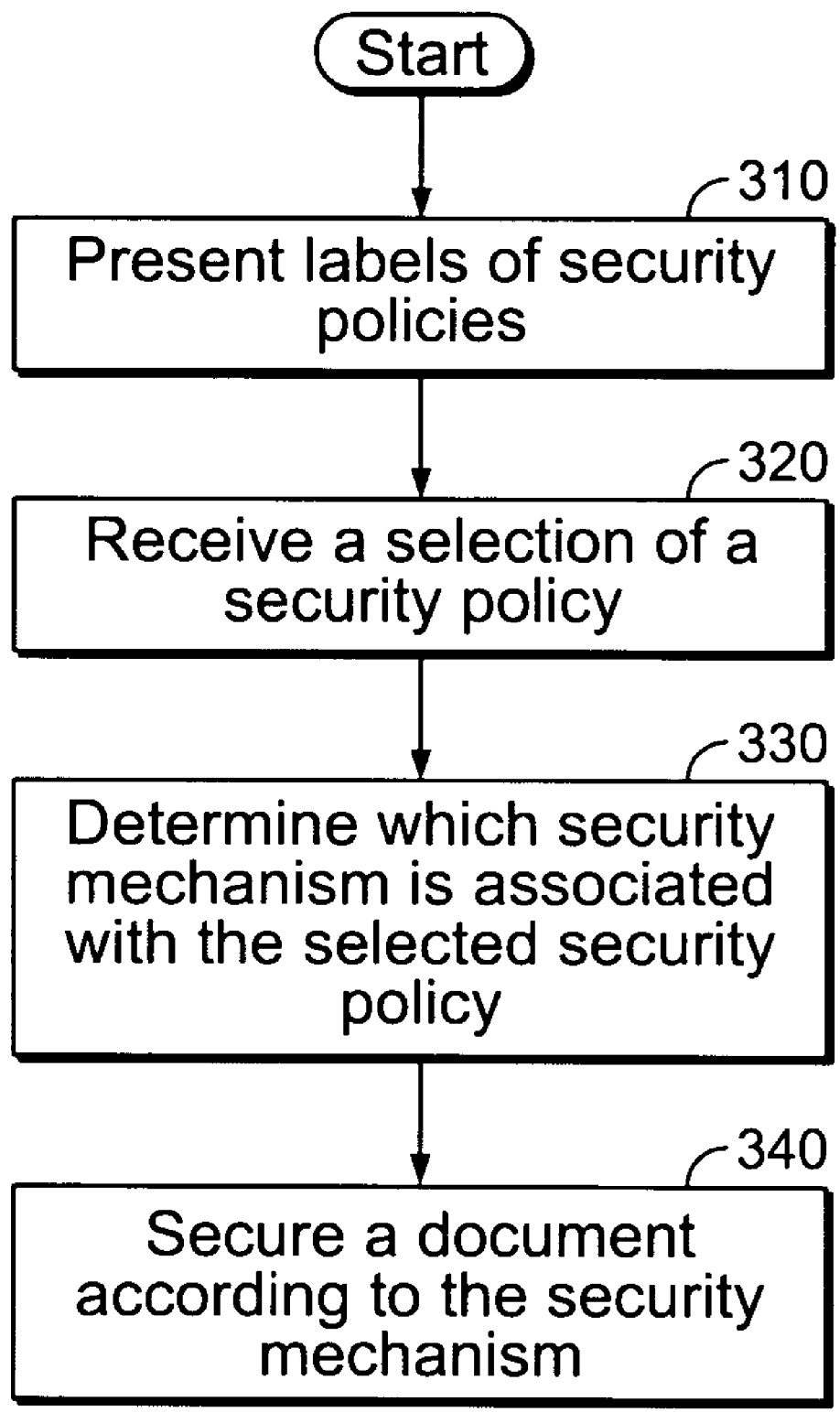
FIG. 3 is a flowchart of a process of securing a document with a policy.

FIG. 3 is a flowchart of a process of securing a document with a policy. The process can be performed by a tool that secures documents and that tool can be part of an application for creating and editing documents, such as Adobe Acrobat Standard (available from Adobe Systems Incorporated, San Jose, Calif.). The process results in a document being secured according to a security mechanism that is determined to be associated with a selection of a security policy without requiring a user to know or understand the security mechanism that is determined to be associated with the selection of a security policy. The application and/or tool that secures a document can be different from the application and/or tool that maintains enforcement of security of the document. For example, enforcement of security can include securing a document and maintaining security for the document, and a first client-based application can secure the document by encrypting the document and a server-based application can maintain enforcement of security by restricting access to the document. In some implementations, any number of documents can be secured and/or any number of security mechanisms can be used to secure a document.

Labels of security policies are presented to user at 310. The labels can be presented to a user in a user interface, such as the user interfaces 200 and 205 of FIGS. 2A and 2B. The labels are presented such that detailed information of some or all of the security mechanisms associated with the policies are not presented to a user. The labels that are presented can include an abstraction of the security mechanisms. By leaving out the detailed information and/or presenting an abstraction of the security mechanisms, a user need not understand the security mechanisms underlying the policies when selecting a policy. Thus, a user that is not familiar with security policies need not be confused by details of security mechanisms or be required to research security policies to make an informed choice. Also, practices for applying policies can be implemented easily. For example, a group of users can have a set of policies where each of the policies has a corresponding label that describes a situation where a policy should be applied. As examples, a set of policies can correspond to the labels "use for interoffice e-mail", "use for external circulation of documents", "use for client X", "use for project Y", and "default policy for work".

Policies with different underlying, associated security mechanisms can be presented to a user. Security mechanisms are different if the mechanisms distinctly enforce security. For example, a first policy can use a client-based security mechanism to secure a document and a second policy can use a server-based security mechanism to secure a document. In that example, the two security mechanisms distinctly enforce security, as one method uses a client-based approach and another uses a server-based approach. An example of where mechanisms do not distinctly enforce security is where different lengths of security keys are used in the same PKI (e.g., a first policy having a PKI with 1024 bit keys and a second policy having a PKI with 2048 bit keys, where the two policies use the same PKI). As another example, mechanisms that use different encryption algorithms, but use a common model of security enforcement, do not distinctly enforce security. For example, RSA (Rivest-Shamir-Adleman) encryption does not enforce security distinctly from PGP ("pretty good privacy") encryption, as the overall model of enforcing security is the same, even though the encryption algorithm is different. Thus, security mechanisms are not different if the strength of enforcement differs and/or the encryption algorithms (or algorithm for securing a document) differ and the process for authentication is the same.

Distinct security mechanisms result in different authentication (or authorization) processes. Differences in authentication processes can include differences that are perceived by a user and/or differences that are not perceived by a user. For example, a user can be asked for a different series or types of input in order to be authenticated. As another example, the interactions between a client application and a server can differ for distinct security mechanisms. As an example, different types of password security might not be distinct if they use the same approach to enforcing security which includes use of a shared password and a client-based model of enforcing password security.

Different security mechanisms that can be associated with a policy can include, depending on the implementation, encryption and/or authentication security (e.g., PKI encryption, such as PGP), password security (e.g., a combination of a user name and password are used to secure a document or simply a password), a client/server document control system that authenticates users to grant access to documents (e.g., Adobe Policy Server; described later), and the like.

To offer a selection of policies with different security mechanisms, the tool that secures a document can coordinate a combination of applications or tools for enforcing security of the document. Any number or combination of security tools can be used together to secure a document. For example, a combination of a client application and a server can enforce security if the client application uses password security to secure a document and the server uses server-based security to control access to a document. In some implementations, the tools or applications that enforce security mechanisms can interpret different rights languages (e.g., XrML ("eXtensible rights Markup Language"), ODRL ("Open Digital Rights Language"), EBX ("Electronic Book Exchange" digital rights management language), XACML ("eXtensible Access Control Markup Language"), and the like).

The security mechanisms that are associated with the policies can be server-based security mechanisms and/or client-based security mechanisms as the tool that secures the document can secure documents according to server or client-based security mechanisms. A server-based security mechanism is a security mechanism that enforces security with the aid of a server and can include the involvement of a client, whereas a client-based security mechanism is enforced at a client and does not involve a server. An example server-based security mechanism is Adobe Policy Server (available from Adobe Systems Incorporated, San Jose, Calif.). With Adobe Policy Server, a central server controls enforcement of policies. If a server running Adobe Policy Server is sent a name of a policy and information about a policy (e.g., settings) to apply, the server applies the policy and enforces it (e.g., by restricting access to users on an access control list).

A selection of a security policy is received, at 320. The selection can be received by a user interface, such as the user interface 200 of FIG. 2A or the user interface 205 of FIG. 2B, where labels of security policies are list items and a selection of a list item corresponds to a label.

At 330, a determination is made as to which security mechanism is associated with the selected security policy. For example, if a label of a security policy is presented to a user and selected by a user, that label can be used to determine a security policy that is to be applied to a document, and the security policy can be used to determine which security mechanism should be applied to the document. An application or a security tool can interpret a policy (e.g., interpret an XrML written policy) corresponding to a label to determine a security mechanism and security mechanism settings to use to secure a document.

At 340, a document is secured according to (e.g., with) the security mechanism that is determined to be associated with the selected policy. The tool securing the document can secure the document according to any combination of types of security mechanisms and can be limited to supporting only certain security mechanisms. As an example, one application can support password and Adobe Policy Server security mechanisms, and does not support PKI security. To support additional security mechanisms, support for plug-ins that support other security mechanisms can be provided. The support can include, as examples, enabling policies to be defined to use a plug-in security mechanism and interpreting a plug-in security mechanism to secure a document.

Because different types of security mechanisms can be employed to secure a document, a tool securing the document, depending on the specific security mechanisms employed, can interface with other applications or tools to enforce security. For example, if Adobe Policy Server is employed, a tool securing the document should interface with a server running Adobe Policy Server to ensure enforcement of a policy.

Once a document is secured, another application or tool (e.g., another installation of the same software product or a different software product) can be used to gain access (e.g., view) the document. That application or tool need not have the same policies as the application or tool used to secure the document, but should understand the security mechanisms employed such that the document can be accessed.

FIG. 4 illustrates an example system in which policies can be distributed and enforced. Included in the example system is a server computer 410, a network 420, a network-accessible storage device 415, and client computers 425 (e.g., end-user computers). The server computer 410 manages documents on its storage device 411 and can manage documents on the network-accessible device 415. In addition, the server computer 410 enforces server-based security mechanisms. For example, if the server computer 410 were to run Adobe Policy Server as a security mechanism to enforce security of documents on the storage device 411, the server computer 410 could be used to receive a request to access a document from a user on a client computer 426, determine if the user can access the document, and grant access to the document (e.g., read the document).

The server computer 410, each of the client computers 425, and the network-accessible storage device 415 are accessible from the network 420. If a document is on the network-accessible storage device 415, each of the client computers 425 can access the document from the network.

Each of the client computers 425 has a tool for securing documents. The tool can be part of a word processing or document creating application, such as Adobe Acrobat Standard. The tool can be used to secure documents and access secured documents. For example, a document can be created on the client computer 426, that document can be stored on the network-accessible storage device 415, and the document creating tool on the client computer 426 can be used to secure the document according to a security policy that is defined to secure documents according to a client-based security mechanism (e.g., password security which encrypts/decrypts a document with a symmetric key, which is derived from a shared password). Then, if another user (e.g., another user on a different client computer) desires to access the document, that user can retrieve the document from the network-accessible storage device 415 and the user can use a security tool of a word processing or document creating tool, such as Adobe Acrobat Standard, to view the document.

An administrative user can use the server computer 410 to manage policies for the client computers 425. For example, the administrative user can generate and modify policies. The policies can be generated according to the process described with reference to FIGS. 1A-1D. As another example, the administrative user can create a group of policies, each of which has a brief description in a label of the policy and distribute those policies to users on the client computers 425.

When the users of the client computers 425 decide to secure documents, they can be presented with a user interface, such as the user interfaces described in relation to FIGS. 2A and 2B, from which they can select a policy. For example, the users can select a policy from policies distributed by an administrative user. Because the users of the client-computers (e.g., end-users) might not be familiar with security mechanisms, the labels of the security policies can represent an abstraction of associated, underlying security mechanisms, that are useful for end-users and leave out details of the underlying security mechanisms. Based on the labels of the security policies, the users of the computer systems can choose a policy with which to secure a document, and a security tool can be used to secure the document according to the underlying security mechanisms. The security tools of the client computers 425 and mechanism on the server computer 410 can be used to enforce security according to the selected security policy. When a user wishes to access a document, a security tool on the client computer on which the user resides can interact with the various tools and/or mechanisms that enforce security of the document such that a user with the proper authorization can access the document.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A machine-implemented method of securing a document, the method comprising:
   receiving security policy definitions of multiple, distinct security policies;
   presenting labels of the multiple, distinct security policies, each security policy specifying criteria that govern use of an electronic document and having an associated security mechanism that distinctly secures an electronic document, wherein the labels include usage abstractions that describe situations in which to use the security policies without describing details of the associated security mechanisms, the usage abstractions being included in the security policy definitions and being presented prior to receiving a selection corresponding to at least one of the multiple security policies;
   receiving input specifying a selected security policy; and
   securing a first document according to the selected security policy.

2. The machine-implemented method of claim 1, wherein criteria that govern use of an electronic document for at least one of the multiple security policies comprises user permission information.

3. The machine-implemented method of claim 2, wherein securing a first document according to the selected security policy comprises restricting access to the first document according to the user permission information.

4. The machine-implemented method of claim 1, wherein the first document is secured according to the selected security policy without requiring a user to input settings for a security mechanism associated with the selected security policy.

5. The machine-implemented method of claim 1, wherein a first security mechanism does not distinctly enforce security of a document as compared to a second security mechanism if the first and second security mechanisms employ a model of security enforcement but differ in one or more aspects of the security enforcement, the one or more aspects being selected from a group comprising encryption algorithm and encryption strength.

6. The machine-implemented method of claim 1, wherein at least one of the labels comprises an abstract of a corresponding security mechanism.

7. The machine-implemented method of claim 1, wherein at least one of the labels comprise a name and a brief description.

8. The machine-implemented method of claim 1, wherein the selected security policy is associated with public key infrastructure security and securing a first document according to the selected security policy comprises securing the document according to public key infrastructure security.

9. The machine-implemented method of claim 1, wherein the security policies are associated with client-based security mechanisms and server-based security mechanisms, and securing a first document according to the selected security policy comprises:
   securing the first document according to a client-based security mechanism if the selected security policy is associated with the client-based security mechanism, and
   securing the first document according to a server-based security mechanism if the selected security policy is associated with the server-based security mechanism.

10. The machine-implemented method of claim 9, wherein the client-based security mechanism comprises password security.

11. The machine-implemented method of claim 1, wherein the security policies include declarative security policies.

12. The machine-implemented method of claim 11, wherein the security policies are written in multiple security languages and securing a first document according the selected security policy comprises interpreting at least one of the multiple security languages.

13. The machine-implemented method of claim 1 further comprising:
   presenting a user interface, different from a user interface presenting the labels, to receive at least one of the security policy definitions, the at least one security policy definition comprising at least one specification of one or more security mechanisms and at least one of the labels;
   receiving user interface inputs that select the at least one security policy definition; and
   generating the at least one security policy.

14. The machine-implemented method of claim 1, wherein the labels are presented at a first system and wherein at least one of the security mechanisms is enforced by an external system other than the first system.

15. The method of claim 1, further comprising:
   administering at least some of the security policies, wherein administering at least some of the security policies comprises distributing the at least some of the security policies to users and modifying a subset of the security policies.

16. A computer program product, tangibly embodied in an information carrier, operable to cause data processing apparatus to perform operations comprising:
   receiving security policy definitions of multiple, distinct security policies;
   presenting labels of the multiple, distinct security policies, the security policies having associated security mechanisms that distinctly secure an electronic document, wherein the labels include usage abstractions that describe situations in which to use the security policies without describing details of the security mechanisms associated with respective security policies, the usage abstractions being included in the security policy definitions and being presented prior to receiving a selection corresponding to at least one of the multiple security policies;
   receiving a selection of a security policy from the security policies;
   determining which security mechanism is associated with the selected security policy; and
   securing a first document according to the security mechanism that is determined to be associated with the selected security policy.

17. The computer program product of claim 16, wherein at least one of the security policies further specifies user permission information.

18. The computer program product of claim 17, wherein securing a first document according to the selected security policy comprises restricting access to the first document according to the user permission information.

19. The computer program product of claim 16, wherein the first document is secured according to the selected security policy without requiring a user to input settings for a security mechanism associated with the selected security policy.

20. The computer program product of claim 16, wherein a first security mechanism does not distinctly enforce security of a document as compared to a second security mechanism if the first and second security mechanisms employ a model of security enforcement but differ in one or more aspects of the security enforcement, the one or more aspects being selected from a group comprising encryption algorithm and encryption strength.

21. The computer program product of claim 16, wherein at least one of the labels comprises an abstract of a corresponding security mechanism.

22. The computer program product of claim 16, wherein at least one of the labels comprise a name and a brief description.

23. The computer program product of claim 16, wherein the selected security policy is associated with public key infrastructure security and securing a first document according to the selected security policy comprises securing the document according to public key infrastructure security.

24. The computer program product of claim 16, wherein the security policies are associated with client-based security mechanisms and server-based security mechanisms, and securing a first document according to the selected security policy comprises:
   securing the first document according to a client-based security mechanism if the selected security policy is associated with the client-based security mechanism, and
   securing the first document according to a server-based security mechanism if the selected security policy is associated with the server-based security mechanism.

25. The computer program product of claim 24, wherein the client-based security mechanism comprises password security.

26. The computer program product of claim 16, wherein the security policies include declarative security policies.

27. The computer program product of claim 26, wherein the security policies are written in multiple security languages and securing a first document according the selected security policy comprises interpreting at least one of the multiple security languages.

28. The computer program product of claim 16, the operations further comprising:

presenting a user interface, different from a user interface presenting the labels, to receive at least one of the security policy definitions, the at least one security policy definition comprising at least one specification of one or more security mechanisms and at least one of the labels;

receiving user interface inputs that select the at least one security policy definition; and generating the at least one security policy.

29. The computer program product of claim 16, wherein the labels are presented at a first system and wherein at least one of the security mechanisms is enforced by an external system other than the first system.

30. The computer program product of claim 16, the operations further comprising:

administering at least some of the security policies, wherein administering at least some of the security policies comprises distributing the at least some of the security policies to users and modifying a subset of the security policies.

31. An apparatus comprising:

a processor; and memory coupled to the processor, the memory including executable instructions for performing operations comprising:

receiving security policy definitions of multiple, distinct security policies;

presenting, in a user interface, labels of the multiple, distinct security policies, each security policy specifying criteria that govern use of an electronic document and having an associated security mechanism that distinctly secures an electronic document, wherein the labels include usage abstractions that describe situations in which to use the security policies without describing details of the associated security mechanisms, the usage abstractions being included in the security policy definitions and being presented prior to receiving a selection corresponding to at least one of the multiple security policies;

receiving input specifying a selected security policy; and securing a first document according to the selected security policy.

32. The apparatus of claim 31, wherein at least one of the security policies further specifies user permission information.

33. The apparatus of claim 32, wherein securing a first document according to the selected security policy comprises restricting access to the first document according to the user permission information.

34. The apparatus of claim 31, the operations further comprising:

administering at least some of the security policies, wherein administering at least some of the security policies comprises distributing the at least some of the security policies to users and modifying a subset of the security policies.

35. The apparatus of claim 31, wherein the first document is secured according to the selected security policy without requiring a user to input settings for a security mechanism associated with the selected security policy.

36. The apparatus of claim 31, wherein a first security mechanism does not distinctly enforce security of a document as compared to a second security mechanism if the first and second security mechanisms employ a model of security enforcement but differ in one or more aspects of the security enforcement, the one or more aspects being selected from a group comprising encryption algorithm and encryption strength.

37. The apparatus of claim 31, wherein at least one of the labels comprises an abstract of a corresponding security mechanism.

38. The apparatus of claim 31, wherein at least one of the labels comprise a name and a brief description.

39. The apparatus of claim 31, wherein the selected security policy is associated with public key infrastructure security and securing a first document according to the selected security policy comprises securing the document according to public key infrastructure security.

40. The apparatus of claim 31, wherein the security policies are associated with client-based security mechanisms and server-based security mechanisms, and securing a first document according to the selected security policy comprises:

securing the first document according to a client-based security mechanism if the selected security policy is associated with the client-based security mechanism, and securing the first document according to a server-based security mechanism if the selected security policy is associated with the server-based security mechanism.

41. The apparatus of claim 40, wherein the client-based security mechanism comprises password security.

42. The apparatus of claim 31, wherein the security policies include declarative security policies.

43. The apparatus of claim 42, wherein the security policies are written in multiple security languages and securing a first document according the selected security policy comprises interpreting at least one of the multiple security languages.

44. The apparatus of claim 31, the operations further comprising:

presenting a user interface, different from the user interface presenting the labels, to receive at least one of the security policy definitions, the at least one security policy definition comprising at least one specification of one or more security mechanisms and at least one of the labels;

receiving user interface inputs that select the at least one security policy definition; and generating the at least one security policy.

45. The apparatus of claim 31, wherein the labels are presented in a user interface at a first system and wherein at least one of the security mechanisms is enforced by an external system other than the first system.

* * * * *